United States Patent
Maj et al.

(10) Patent No.: US 8,557,149 B2
(45) Date of Patent: Oct. 15, 2013

(54) SYSTEM AND METHOD FOR IMPLEMENTING ENHANCED OPTICS FABRICATION

(75) Inventors: Jozef A. Maj, Lemont, IL (US); Charles Harmata, Chicago, IL (US)

(73) Assignee: UChicago Argonne, LLC, Chicago, IL (US)

( * ) Notice: Subject to any disclaimer, the term of this patent is extended or adjusted under 35 U.S.C. 154(b) by 194 days.

(21) Appl. No.: 13/082,909

(22) Filed: Apr. 8, 2011

(65) Prior Publication Data

US 2012/0256332 A1 Oct. 11, 2012

(51) Int. Cl.
  *B29D 11/00* (2006.01)
  *B29C 39/10* (2006.01)

(52) U.S. Cl.
  USPC ........... 264/1.7; 425/405.1; 264/87; 264/1.32

(58) Field of Classification Search
  USPC ................. 264/1.32, 1.7, 87; 425/808, 405.1
  See application file for complete search history.

(56) References Cited

U.S. PATENT DOCUMENTS

| | | | |
|---|---|---|---|
| 4,599,741 A * | 7/1986 | Wittry | 378/85 |
| 4,807,268 A | 2/1989 | Wittry | |
| 4,949,367 A | 8/1990 | Huizing et al. | |
| 6,236,710 B1 | 5/2001 | Wittry | |
| 7,195,476 B2 * | 3/2007 | Ito | 425/388 |
| 7,329,372 B2 * | 2/2008 | Tsunetomo et al. | 264/2.5 |
| 7,413,430 B2 * | 8/2008 | Kurimura et al. | 425/405.1 |
| 2003/0052425 A1 * | 3/2003 | Griffith | 264/1.32 |
| 2010/0323105 A1 * | 12/2010 | Hosoe | 427/162 |

* cited by examiner

*Primary Examiner* — Joseph S Del Sole
*Assistant Examiner* — Nahida Sultana
(74) *Attorney, Agent, or Firm* — Joan Pennington

(57) ABSTRACT

A system and method are provided for implementing enhanced optics fabrication for making a concave focusing optical lens with a selected material of a crystal or an amorphous material and a support member. A cut-out is formed in the support member with a depth based upon the final, desired curvature of the concave focusing optical lens. The cut-out is partially filled with an epoxy and the selected crystal or amorphous material is placed on top thereby creating a quasi-vacuum seal. A vacuum pump is connected to the support member, providing a set vacuum level until the epoxy has hardened and the selected crystal or amorphous material has achieved its final curvature. Vacuum pressure is substantially uniformly applied to the crystal, providing substantially uniform stresses on the surface of the final concave focusing optical lens.

14 Claims, 4 Drawing Sheets

SYSTEM AND METHOD FOR IMPLEMENTING ENHANCED OPTICS FABRICATION

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

The present invention relates generally to the field of optic technologies, and more particularly, relates to a system and method for implementing enhanced optics fabrication, more specifically, a system and method for implementing enhanced optics fabrication in which a crystal wafer undergo curvature due to forces created by vacuum rather than the standard compressive techniques.

DESCRIPTION OF THE RELATED ART

Scientists have attempted to fabricate concave optics by compressing the crystal wafer between a concave and a convex die. Generally, to obtain concave optics, a silicon crystal wafer is set between an upper convex and lower concave hemispherical die and force is applied with a magnitude that is dependent upon the final desired curvature.

Bending the silicon crystal through the application of tool compression does not preserve uniform stress on the curvature of the surface. As a result, the performance of the crystal is reduced thereby creating poor resolution.

Various methods have been proposed for manufacturing concave optics such as disclosed in the following patents.

U.S. Pat. No. 4,807,268 issued Feb. 21, 1989 to David B. Wittry discloses a doubly-curved crystal for use in a scanning monochromator that is oriented with respect to a reference plane containing source and image locations of the monochromator. The crystal has concave planes of lattice points and a concave crystal surface which satisfy Johannson geometric conditions within the reference plane for a Rowland circle of radius R. The planes of lattice points are substantially spherically curved to a radius of 2 R, and the crystal surface is substantially toroidally curved with a radius of substantially 2 R within a plane perpendicular to the reference plane. The crystal may be formed by plastically deforming a cylindrically curved crystal blank over a doubly-curved convex die. A disclosed method of fabricating the doubly-curved crystal involves preparing at least one crystal lamella having planes of lattice points and having an adjacent crystal surface which is curved cylindrically about a preselected axis; placing the lamella onto a convex mold curved to a preselected radius in the direction of cylindrical curvature and curved in a perpendicular direction to substantially twice that radius; covering the lamella with a continuous sheet of material able to withstand elevated temperatures; heating the mold, the lamella and the sheet to a temperature at which the sheet is flexible and at which the lamella can be deformed; and creating a partial vacuum beneath the sheet to draw it downwardly against the lamella and plastically deform the lamella to give the lamella a concave surface which matches the face of the mold.

U.S. Pat. No. 6,236,710 issued May 22, 2001 to David B. Wittry discloses a curved crystal x-ray optical device that consists of a doubly curved crystal lamella attached by a thick bonding layer to a backing plate that provides for prepositioning it in three dimensions relative to a source and image position in x-ray spectrometers, monochromators and point-focusing x-ray focusing instruments. The bonding layer has the property of passing from a state of low viscosity to high viscosity by polymerization or by a temperature change. In fabrication, the crystal lamella is bent so that its atomic planes are curved to a radius of $2R_1$ in a first plane where $R_1$ is the radius of a focal circle and $R_2$ in a second plane perpendicular to the first plane by forcing it to conform to the surface of a doubly curved convex mold using pressure produced in the highly viscous bonding material by force applied to the backing plate. By bonding the crystal to its substrate by a thick bonding agent that has high viscosity in its initial state and that hardens to a solid in its final state, and the crystal is bent to its final state by bending it to conform to a convex mold that has the desired shape of the surface of the crystal using pressure that is applied to the crystal by the viscous bonding agent which receives pressure from a force applied to the backing plate during fabrication. Additional special configurations of the mold containing the surface used for bending, and special characteristics of the crystal and backing plate make the crystal device more convenient to use and easier to align.

U.S. Pat. No. 4,949,367 issued Aug. 14, 1990 to Albert Huizing discloses an X-ray analysis crystal that is curved in a direction transverse to the dispersion direction to increase the radiation efficiency. As a result of this radiation diffracted at the crystal is focused towards a detector input. In order to ensure a non-deformable crystal surface the crystal is preferably bonded to a carrier having an adapted bonding profile.

Currently single silicon crystal optical lens are manufactured in a die and mold process which compresses the crystal. This process results in residual stresses which typically result in non-coherent optically reflected images. Often these crystals are diced by cutting the crystal into much smaller squares and using a plastic backing to hold the diced unit together to improve the backscattered image. Disadvantages of known optical lens fabricating processes include cost, time, and importantly the residual stresses in the crystal, rendering the fabricated optical lens ineffective for its intended use.

A need exists for an effective mechanism and method of fabricating concave/convex optics. It is desirable to implement enhanced optics fabrication that substantially reduces the amount of residual stress and aberration that occurs by eliminating the forceful bending of conventional standard devices, typically fabricated standard compressive techniques.

SUMMARY OF THE INVENTION

A principal aspect of the present invention is to provide a system and method for implementing enhanced optics fabrication. Other important aspects of the present invention are to provide such system and method substantially without negative effect and that overcome some of the disadvantages of prior art arrangements.

In brief, a system and method are provided for implementing enhanced optics fabrication for making a concave focusing optical lens. The method includes a selected material of a crystal or an amorphous material and a support member. A cut-out with a depth that has been calculated based on the final, desired curvature of the focusing optical lens is formed in the support member. The cut-out is partially filled with an epoxy and the selected material is placed on top thereby creating a quasi-vacuum seal. A vacuum pump is connected to the support member for providing a set vacuum level to produce a curvature in the focusing optical lens. The set vacuum level is continued until the epoxy has hardened and the focusing optical lens has achieved its final curvature. Vacuum pressure is substantially uniformly applied to the selected material, providing substantially uniform stresses on the material surface of the final concave focusing optical lens.

In accordance with features of the invention, the epoxy is a slow drying epoxy and is deposited in an outer edge of the cut-out that preferably is a precision machined cut-out having a selected shape such as cylindrical or elliptical. The machined cut-out is a stepped opening having an upper portion with a diameter approximately equal to a diameter of the initial material of crystal or amorphous material. The diameter of the initial material of crystal or amorphous material is selected in a range between about 5 inches and 12 inches.

In accordance with features of the invention, the selected depth of the cut-out and the vacuum pressure or dynamic vacuum gas flow are selectively provided to produce a final, desired curvature of the concave focusing optical lens. For example, the concave focusing optical lens includes a selected profile for the concave shape, such as a spherical profile, an elliptical profile, a toroidal profile, or a parabolic profile.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a new method of fabricating concave/convex optics is provided in which a selected material of a crystal or an amorphous material undergo selective curvature due to forces created by vacuum rather than the standard compressive techniques. This method substantially reduces the amount of residual stress and aberration that occurs by eliminating the forceful bending of such standard devices. This invention solves a difficult problem faced by those wishing to create a material surface, with even modest curvature, without causing non-uniform residual surface stresses.

Figure 1:
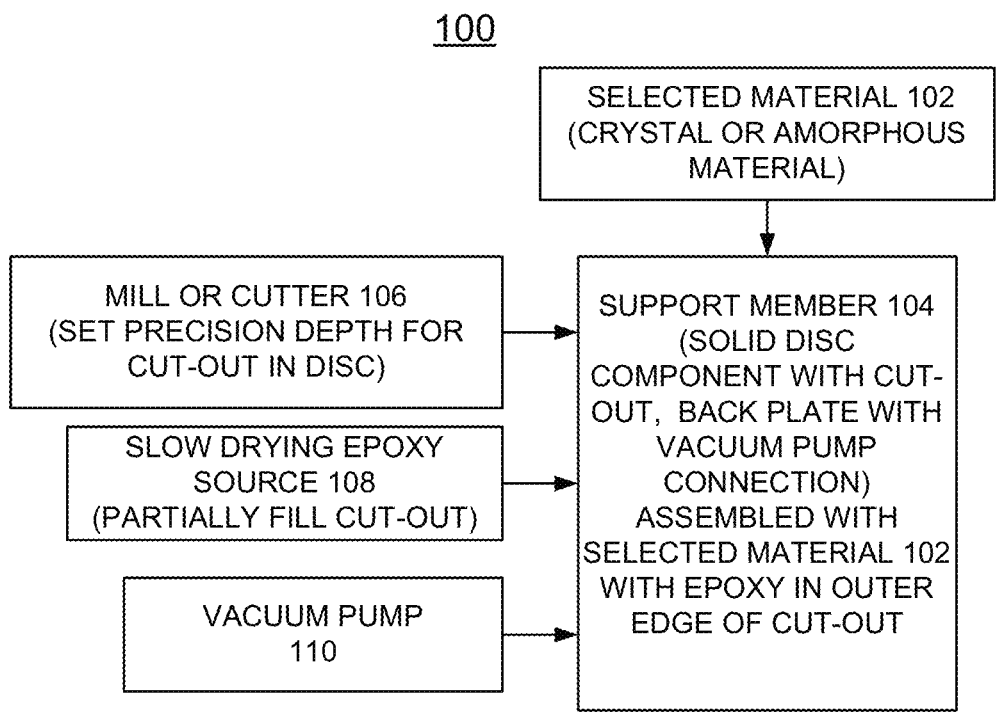
FIG. 1 is a block diagram illustrating exemplary apparatus for implementing enhanced optics fabrication in accordance with the preferred embodiment.

Having reference now to the drawings, in FIG. 1, there is shown exemplary apparatus or system for implementing enhanced optics fabrication generally designated by the reference character 100 in accordance with the preferred embodiment. The apparatus or system 100 includes an initial selected material of a crystal or an amorphous material 102 and a support member 104, such as a solid disc component.

The selected material of a crystal or an amorphous material 102 is a selected optical material, such as a silicon crystal, a germanium crystal, a quartz crystal, a beryllium crystal, a silicon wafer, single-structure silicon crystal; a fused silica, a copper oxide, a silicon carbide, or a glass ceramic, such as Zerodur made by Scott AG. The support member 104 can be implemented with various different available materials, such as aluminum, stainless steel or brass.

The apparatus or system 100 includes a mill or cutter 106 to provide a cut-out in the disc support member 104. A cut-out is formed, for example, precision machined with a set depth in the support member 104. The set depth of the cut-out has been calculated based on the final, desired curvature of the concave focusing optical lens. The cut-out has a selected shape, such as cylindrical or elliptical.

The apparatus or system 100 includes an epoxy source 108, such as a slow drying epoxy. It should be understood that various different sealants, glues, or adhesives can be used for the slow drying epoxy 108. The apparatus or system 100 includes a vacuum pump 110 for providing a set vacuum level to the assembled selected crystal or amorphous material 102 in the support member 104.

Figure 2:
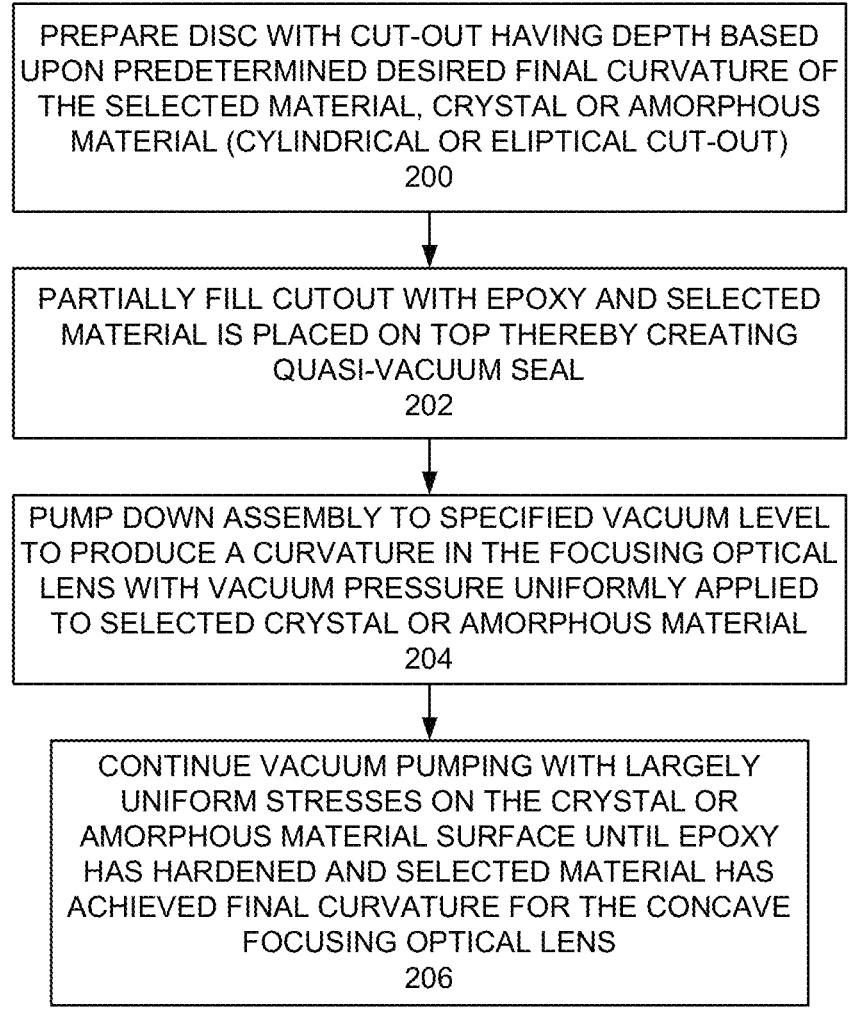
FIG. 2 is a flow chart illustrating exemplary steps for implementing a method for fabricating enhanced optics in accordance with the preferred embodiment.

Referring also to FIG. 2, there are shown exemplary process steps for fabricating enhanced optics in accordance with the preferred embodiment. As indicated at a block 200, the support member 104 is prepared with a cut-out, such as a cylindrical or elliptical cut-out, having a selected depth based upon predetermined desired final curvature of the final concave focusing optical lens being fabricated. The cut-out of the support member 104 is partially filled with the epoxy 108 and the selected crystal or amorphous material 102 is placed on top thereby creating a quasi-vacuum seal as indicated at a block 202. As indicated at a block 204, a vacuum pump 110 is connected to an opposite side of the support member 104 for providing a specified or set vacuum level to produce a curvature in the final concave focusing optical lens being fabricated. The vacuum pumping is continued until the epoxy has hardened and the selected crystal or amorphous material 102 has achieved its final curvature as indicated at a block 206.

In accordance with features of the invention, vacuum pressure is substantially uniformly applied to the selected crystal or amorphous material 102, providing substantially uniform stresses on the surface of the selected crystal or amorphous material 102 of the final concave focusing optical lens.

Figure 3:
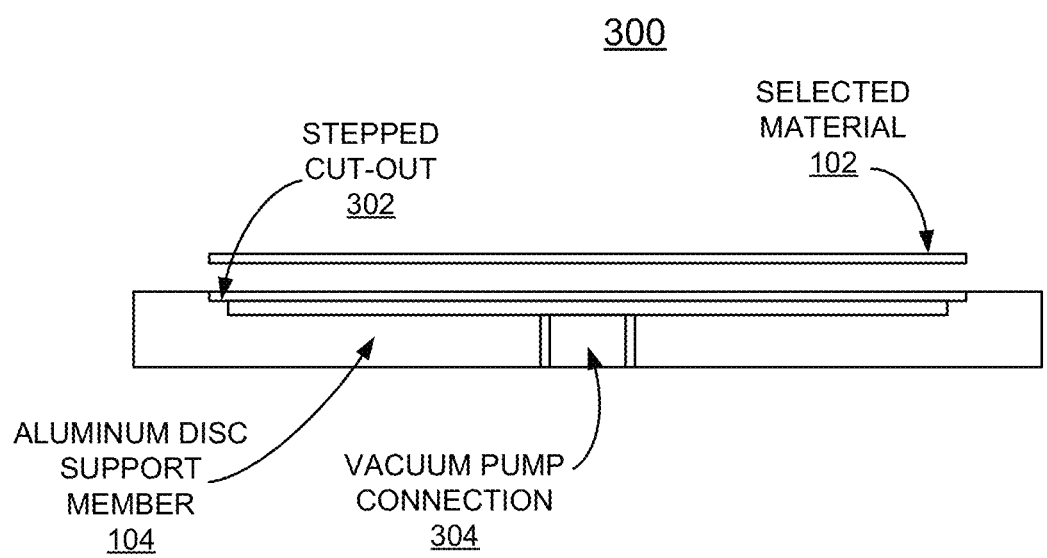
FIG. 3 is a diagram schematically illustrating a selected material of a crystal or an amorphous material and a support member of the exemplary apparatus of FIG. 1 for implementing enhanced optics fabrication in accordance with the preferred embodiment.

Referring also to FIG. 3, there are shown an example selected crystal or amorphous material 102 and support member 104 of the exemplary apparatus 100 of FIG. 1 for implementing enhanced optics fabrication in accordance with the preferred embodiment.

As shown in FIG. 3, the support member 104 preferably includes a precision machined cut-out 302 that is a stepped opening having an upper portion with a diameter approximately equal to a diameter of the selected material 102. The diameter of the selected crystal or amorphous material 102 is selected in a range between about 5 inches and 12 inches. In an opposite side of the support member 104 from the stepped cut-out 302, a centrally located opening 304 is formed for connection to the vacuum pump 110. The selected crystal or amorphous material 102 is placed in the partially epoxy filled cut-out 302 of the support member 104, and the vacuum pump 110 is connected. The selected crystal or amorphous material 102 and support member 104 are inverted, for example, placed on a flat table, until the epoxy has hardened hours later.

Atmospheric pressure deforms the crystal to the appropriate curved shape by maintaining a constant perpendicular pressure on the crystal surface.

In accordance with features of the invention, the depth of the cut-out 302 and the vacuum pressure or dynamic continuous vacuum gas flow provided during the hardening of the slow drying epoxy 108 are selectively provided to produce a final, desired curvature of the concave focusing optical lens. For example, the concave focusing optical lens includes a selected profile for the concave shape, such as a spherical profile, an elliptical profile, a toroidal profile or a parabolic profile, selectively determined by adjustment of either one or both of the depth of the cut-out 302 and the vacuum pressure or dynamic continuous vacuum gas flow.

Figure 4:
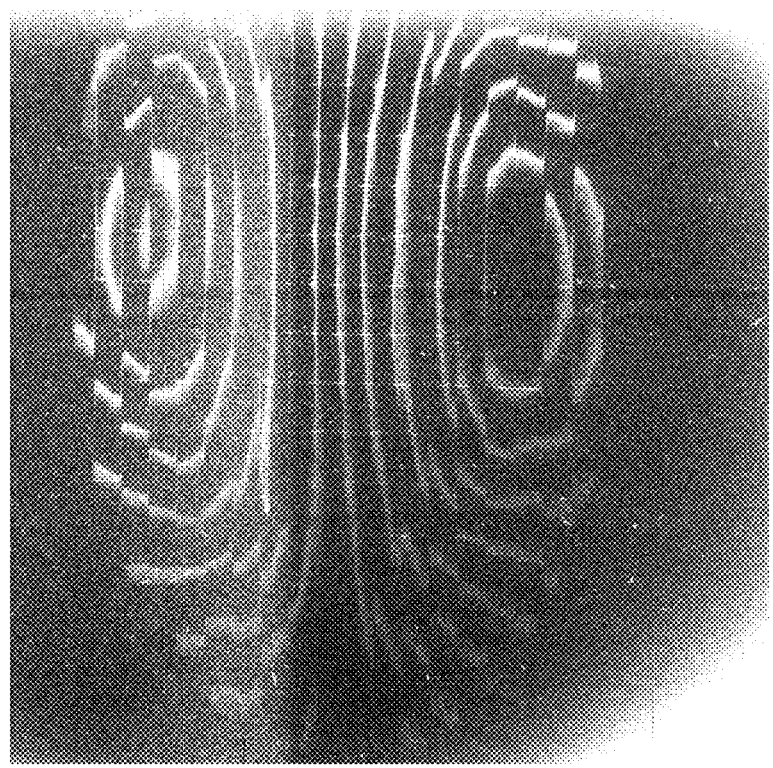
FIG. 4 illustrates a surface stress analysis of the fabricated optics of the invention showing an enhanced, substantially even surface stress distribution resulting from the uniformly applied vacuum pressure to the crystal or amorphous material, with the stresses on the material surface being largely uniform in accordance with the preferred embodiment.

Referring also to FIG. 4, there is shown a surface stress analysis for the fabricated optics of the invention generally designated by the reference character 400. The illustrated surface stress analysis 400 shows an enhanced, substantially even surface stress distribution resulting from the uniformly applied vacuum pressure to the selected crystal or amorphous material 102, with the stresses on the surface of the selected crystal or amorphous material being largely uniform in accordance with the preferred embodiment.

A commercially available material used for the selected material 102 of a silicon wafer or single-structure silicon crystal is sold by Silicon Quest International of Santa Clara, Calif. 95050, USA. A pump assembly manufactured and sold by Elnik Systems Division of IPM Inc, of Fairfield, N.J. 07004, USA can be used for the vacuum pump 110. An example slow drying epoxy used for the epoxy 108 is sold by EPO-Tek of Billerica, Mass. 01821, USA.

In brief, the new process of the invention is significant because the fabricated, final concave focusing optical lens has substantially uniform stresses on the surface of the concave focusing optical lens. In order for concave optics to function optimally, the material surface or crystal wafers should be free of non-uniform stress. Elimination of surface stress is very important in the development of mirrors, monochromators, and x-ray detectors. Since this new method of the invention does not require the use of traditional, precision, expensive concave/convex dies, the cost of production is significantly lowered. The method of the invention improves quality, reduces costs, simplifies design, decrease residual stress and makes the stress very uniform on the surface of the component.

The method of the invention provides a fabricated, final concave single silicon crystal optical lens that would be useful for improving the following optic technologies: 1. X-ray concave analyzers (for APS beamline users); 2. High-resolution X-ray focusing concave (elliptical) curved crystal, (http://www.opticsinfobase.org/coljabstract.cfm ?uri=col-2-8-49 5); (http://spie.org/x648.html?productjd=193145); 3. Powder diffraction concave optics; 4. Hard x-ray microbeam spherical concave minors; 5. Nanofocusing lenses Concave imagers (synthetic retina); 6. Curved detectors; 7. Concave ultrasound focusing devices; 8. Diced analyzers (for Japan Atomic Energy Agency, SPring-81-1-1 Koto, Sayo-cho, Sayo-gun 679-5148 Hyogo, Japan); and 9. Solar cell system with the concave silicon crystal mirror (http://www.nature.com/nmat/journal/v4/n1/full/nmat1282.html).

While the present invention has been described with reference to the details of the embodiments of the invention shown in the drawing, these details are not intended to limit the scope of the invention as claimed in the appended claims.

What is claimed is:

1. A method for implementing enhanced optics fabrication for making a concave focusing optical lens comprising:

providing a selected material of a crystal or an amorphous material;

providing a support member having a cut-out with a set depth based upon a final, desired curvature of the concave crystal optical lens;

partially filling said cut-out with an epoxy;

placing said crystal on said cut-out, creating a quasi-vacuum seal; and connecting a vacuum pump to said support member, providing a set vacuum level providing substantially uniform vacuum pressure to said crystal, and continuing said set vacuum level until the epoxy has hardened providing substantially uniform stresses on the surface of the final concave focusing optical lens, and said selected material has the final, desired curvature for the concave focusing optical lens.

2. The method as recited in claim 1 wherein providing said support member includes providing said support member formed of a selected material, said selected material including a selected one of aluminum, stainless steel, and brass.

3. The method as recited in claim 2 wherein providing said support member includes providing a precision machined cut-out having a selected shape, and having said set depth, said selected shape including a selected one of a cylindrical shape and an elliptical shape.

4. The method as recited in claim 1 wherein connecting a vacuum pump to said support member, providing a set vacuum level providing substantially uniform vacuum pressure to said crystal, and continuing said set vacuum level until the epoxy has hardened providing substantially uniform stresses on the surface of the final concave focusing optical lens, and the selected material has achieved the final curvature for the concave focusing optical lens includes connecting said vacuum pump to an opposite side of said support member from said cut-out.

5. The method as recited in claim 1 wherein connecting a vacuum pump to said support member, providing a set vacuum level providing substantially uniform vacuum pressure to said crystal, and continuing said set vacuum level until the epoxy has hardened providing substantially uniform stresses on the surface of the final concave focusing optical lens, and the selected material has achieved the final curvature for the concave focusing optical lens includes providing a selected vacuum level based upon a final, desired curvature of the concave focusing optical lens.

6. The method as recited in claim 1 wherein said selected material of a crystal or an amorphous material includes a selected one of a silicon crystal, a germanium crystal, a quartz crystal, a beryllium crystal, a single-structure silicon crystal, a fused silica, a copper oxide, a silicon carbide, and a glass ceramic; and wherein said epoxy is a slow drying epoxy.

7. The method as recited in claim 1 wherein partially filling said cut-out with an epoxy including depositing said epoxy in an outer edge of the cut-out.

8. The method as recited in claim 1 wherein said cut-out is a stepped opening having an upper portion with a diameter approximately equal to a diameter of said selected material of a crystal or an amorphous material.

9. The method as recited in claim 1 wherein providing said selected material of a crystal or an amorphous material includes providing said selected material having a set diameter in a range between about 5 inches and 12 inches.

10. The method as recited in claim 1 includes selectively providing said set depth of the cut-out and said set vacuum level to produce a final, desired curvature of the concave focusing optical lens.

11. The method as recited in claim 10 wherein selectively providing said set depth of said cut-out and said set vacuum level to produce a final, desired curvature for the concave focusing optical lens includes producing a final, desired curvature for the concave focusing optical lens having a selected spherical profile for the concave focusing optical lens.

12. The method as recited in claim 10 wherein selectively providing said set depth of said cut-out and said set vacuum level to produce a final, desired curvature for the concave focusing optical lens includes producing a final, desired curvature for the concave focusing optical lens having a selected elliptical profile for the concave focusing optical lens.

13. The method as recited in claim 10 wherein selectively providing said set depth of said cut-out and said set vacuum level to produce a final, desired curvature for the concave focusing optical lens includes producing a final, desired curvature for the concave focusing optical lens having a selected parabolic profile for the concave focusing optical lens.

14. The method as recited in claim 10 wherein selectively providing said set depth of said cut-out and said set vacuum level to produce a final, desired curvature for the concave focusing optical lens includes producing a final, desired curvature for the concave focusing optical lens having a selected toroidal profile for the concave focusing optical lens.

* * * * *